United States Patent Office 3,847,934
Patented Nov. 12, 1974

3,847,934
7-[IMIDAZOLINYL-(2)-AMINO]-INDAZOLES
Peter Neumann, Bern, Switzerland, assignor to Wander Ltd. (also known as Wander AG), Bern, Switzerland
No Drawing. Filed Nov. 29, 1972, Ser. No. 310,204
Claims priority, application Switzerland, Dec. 1, 1971, 17,453/71; Oct. 12, 1972, 14,893/72
Int. Cl. C07d 49/34
U.S. Cl. 260—309.6    23 Claims

ABSTRACT OF THE DISCLOSURE

The invention concerns compounds of the formula,

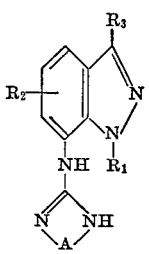

wherein $R_1$ is hydrogen or alkyl,
$R_2$ is hydrogen, halogen, alkyl, alkoxy or alkylthio,
$R_3$ is hydrogen, halogen, alkyl, alkoxy or hydroxy, and
A is dimethylene, trimethylene, hydroxydimethylene, hydroxytrimethylene, alkyldimethylene or alkyl-trimethylene, useful as anti-hypertensives.

IMPROVEMENTS IN OR RELATING TO ORGANIC COMPOUNDS

This invention relates to 7-amino-indazole derivatives. The present invention provides compounds of formula I,

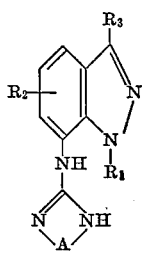

wherein $R_1$ is hydrogen or alkyl of 1 to 3 carbon atoms,
$R_2$ is hydrogen, fluorine, chlorine, bromine, or alkyl, alkoxy or alkylthio of 1 to 3 carbon atoms,
$R_3$ is hydrogen, fluorine, chlorine, bromie, alkyl or alkoxy of 1 to 3 carbon atoms, or hydroxy, and
A is dimethylene, trimethylene, hydroxydimethylene, hydroxythimethylene, alkyl-dimethylene of 3 to 5 carbon atoms or alkyl-trimethylene of 4 to 6 carbon atoms.

The compounds of formula I are capable of tautomerism. The tautomeric forms are represented by formulae I, Ia and Ib:

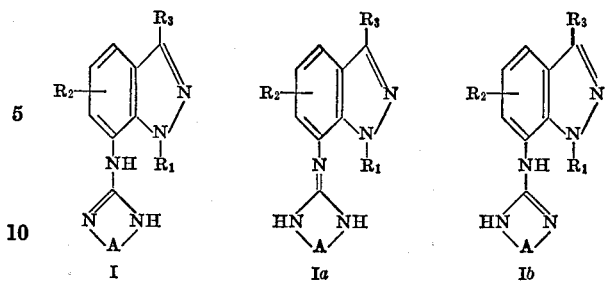

For the sake of simplicity, reference is hereafter made to formula I, or the appropriate corresponding chemical name, but it is not intended that the invention be limited to the compound in the particular form depicted in formula I or defined by a corresponding chemical name. It will be furthermore appreciated that similar tautomerism may exist for structurally analogous compounds described hereafter.

Futher, in accordance with the invention a compound of formula I may be obtained by a process comprising (a) reacting a compound of formula II,

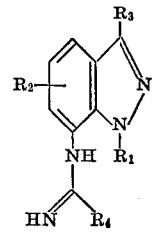

wherein
$R_1$, $R_2$ and $R_3$ are as defined above, and $R_4$ is a leaving group, preferably a group of formula —S—$R_5$, —O—$R_5$ or —NH—$NO_2$, wherein $R_5$ is hydrogen or alkyl of 1 to 3 carbon atoms,
with a compound of formula III, $$NH_2—A—NH_2 \qquad III$$

wherein A is as defined above,
(b) subjecting a compound of formula V,

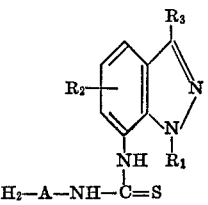

wherein $R_1$, $R_2$, $R_3$ and A are as defined above, to a ring closure, or (c) reacting a compound of formula VI,

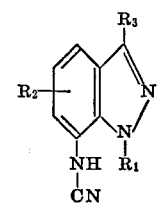

wherein $R_1$, $R_2$ and $R_3$ are as defined above, with a compound of formula III.

Process variant (a) may be effected as follows: A compound of formula II may be reacted with a compound of formula III, preferably with an excess of a compound of formula III. The reaction may be preferably effected in an inert solvent, for example a polar solvent, e.g. water or an alcohol of 1 to 8 carbon atoms, such as methanol, a cyclic ether such as dioxane, or a nitro compound such as nitromethane or nitrobenzene. Alternatively, if the compound of formula III is liquid at the reaction temperature, e.g. in free base form, then this compound may be used as the reaction medium.

The reaction may, for example, be effected at a temperature of from 50° C. to the temperature of the reaction mixture boiling under reflux, conveniently from 110 to 160° C.

The reaction may be conveniently effected with a compound of formula II or III in acid addition salt form, conveniently in the monoacid addition salt form, for example a $p$-toluenesulfonic acid salt form or a hydrohalide salt form such as an iodide, which salt form may be formed *in situ* in conventional manner, by the addition of acid to the compound of formula II or III. When a salt of a compound of formula II is used for the reaction, then a basic compound of formula III may be used as reactant, and *vice versa*.

Process variant (b) may be effected as follows: The ring closure of a compound of formula V may, for example, be conveniently effected in an inert solvent, preferably in a polar solvent, such as an alcohol of 1 to 5 carbon atoms, e.g. ethanol, water or dimethyl formamide. The reaction may be effected at a temperature from 20° C. to the temperature of the reaction mixture boiling under reflux, preferably from 60 to 110° C. The reaction may be conveniently effected in the presence of a base, e.g. an alkali metal or alkaline earth metal hydroxide, such as potassium or sodium hydroxide, or a heavy metal compound such as mercury oxide or lead acetate.

Process variant (c) may be effected as follows: A compound of formula VI may, for example, be reacted with a compound of formula III, preferably at a temperature of from 50° C. to the temperature of the reaction mixture boiling under reflux, conveniently from 110 to 160° C. The reaction may be effected in an inert solvent, for example an alcohol of 3 to 8 carbon atoms, such as n-pentanol, or if the compound of formula III, e.g. in free base form, is liquid at the reaction temperature, the reaction may be effected in the presence of excess compound of formula III as the reaction medium.

The reaction may be preferably effected with an acid addition salt of a compound of formula VI or formula III, conveniently a monoacid addition salt form of a compound of formula III.

The compounds of formulae II and III in free base form may be converted into acid addition salt forms by reaction with the appropriate amount of acid to produce, e.g. a monoacid addition salt form, in conventional manner.

The resulting compounds of formula I may be isolated from the reaction mixture in known manner, e.g. by extraction, precipitation or acid addition salt formation, and may be purified in known manner, e.g. by recrystallization.

The compounds of formula II, used as starting materials in process variant (a), may be produced as follows:

(a') A compound of formula IV,

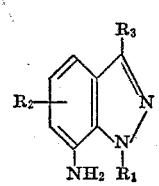

IV wherein $R_1$, $R_2$ and $R_3$ are as defined above, may, for example, be reacted conveniently in an inert solvent, e.g. acetone, preferably at the boil, with N-benzoyl isocyanate, or the reaction product of benzoyl chloride and ammonium thiocyanate conveniently obtained in acetone at a low temperature. The resulting N-benzoyl-N'-indazolyl - (7) - thiourea may be saponified in a basic solution, e.g. aqueous alkali metal hydroxide solution, conveniently at the boil, to produce N-indazolyl-(7)-thiourea of formula VII,

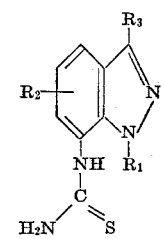

VII wherein $R_1$, $R_2$ and $R_3$ are as defined above, which is a tautomeric form of a compound of formula II wherein $R_4$ is —$SR_5$ and $R_5$ is hydrogen. The compound of formula VII may, for example, be reacted with an alkylating agent, e.g. an alkyl halide, conveniently in an inert solvent, e.g. methanol, conveniently at the boil. The corresponding compound of formula II wherein $R_4$ is an —$SR_5$ radical wherein $R_5$ is alkyl, may be liberated from the resulting salt with a base, if necessary.

(b') When silver cyanate is used in place of ammonium thiocyanate in the process (a') above, and after alkylating the resulting compound in alkaline solution, a corresponding compound of formula II wherein $R_4$ is an —$OR_5$ radical, may be obtained.

(c') A compound of formula II wherein $R_4$ is an

—NH—NO₂ radical may, for example, be obtained by reacting a compound of formula IV with methylnitrosonitroguanidine in known manner.

The compounds of formula V used as starting materials in process variant (b), may, for example, be produced as follows:

A compound of formula IV may be reacted, conveniently at room temperature, with thiophosgene preferably in acid, for example aqueous hydrochloric acid. The resulting 7-isothiocyanato-indazole may be reacted, conveniently at room temperature, with a compound of formula III, conveniently in an inert solvent, e.g. chloroform.

The compounds of formula VI used as starting materials in process variant (c), may be produced as follows:

A compound of formula VII may be dissolved or suspended in an aqueous basic medium, e.g. in a solution of an alkali metal hydroxide such as potassium hydroxide, and may be dehydrosulfurized conveniently at the boil, by a dehydrosulfurizing agent, e.g. a heavy metal salt such as lead acetate.

The compounds of formula IV, used as starting materials in the above process, are known or may be produced in known manner from known starting materials. The compounds of formula III, likewise used as starting materials, are known.

Insofar as the production of starting materials is not particularly described, these are known or may be produced and purified in accordance with known processes, or in a manner analogous to the processes described herein or to known processes, including the protecting and deprotecting, in conventional manner, of reaction sensitive groups, e.g. hydroxy, if necessary.

The compounds of formula I obtained in accordance with the invention are crystalline or oily compounds at room temperature. Free base forms of compounds of formula I may be converted into acid addition salt forms in conventional manner, and *vice versa.*

Suitable inorganic acids for acid addition salt formations are hydrohalic acids, sulfuric and phosphoric acid, and suitable organic acids are toluenesulfonic, acetic, malonic, succinic, malic, maleic and tartaric acid.

The compounds of formula I are new and have hitherto not been described in the literature.

The compounds of formula I are useful because they possess pharmacological activity in animals. In particular the compounds are useful as anti-hypertensives as indicated by the lowering of blood pressure on p.o. administration of 0.01 to 5 mg./kg. animal body weight, of the compound in experimentally hypertonic rats, in accordance with the method of F. Gross, P. Lustallot and F. Sulser [Arch. exper. Path. Pharmakol. 229, 381–388 (1956)].

For the above-mentioned use, the dosage will, of course, vary depending on the compound employed, mode of administration and treatment desired. However, in general, satisfactory results are obtained when administered at a daily dosage of from about 0.007 mg. to about 5 mg. per kilogram animal body weight, conveniently given in divided doses 2 to 4 times a day or in sustained release form. For the larger mammals, the total daily dosage is in the range from about 0.5 to 300 mg. and dosage forms suitable for oral administration comprise from about 0.125 mg. to about 150 mg. of the compound admixed with a solid or liquid pharmaceutical carrier or diluent.

Specific examples of daily dosages, at which satisfactory results are obtained, are:

(i) 7-(imidazolinyl-(2)-amino)-1-methylindazole, 3.3 mg./kg. animal body weight, administered p.o.;
(ii) 4-chloro-7-[imidazolinyl-(2)-amino]-1-methylindazole, from 2 to 5 mg./kg. animal body weight, administered p.o.; and
(iii) 1,4-dimethyl-7-[imidazolinyl-(2)-amino]-indazole, from 2 to 5 mg./kg. animal body weight, administered p.o.;
7-[Imidazolinyl-(2)-amino]-1-methylindazole has particularly interesting properties.

The compounds of formula I may be administered in free base form or in pharmaceutically acceptable acid addition salt form. Such acid addition salt forms exhibit the same order of activity as the free base forms. The compounds of formula I may be administered as pharmaceutical compositions comprising a compound of formula I in free base form or in pharmaceutically acceptable acid addition salt form, in association with a pharmaceutical carrier or diluent.

Such compositions may be prepared by conventional techniques to be in the form of, for example, capsules, tablets, suspensions or solutions, for enteral or parenteral administration. Aside from the usual pharmaceutical diluents or carriers, e.g. water, alcohol, talc, stearic acid, natural or hardened oils and waxes, these pharmaceutical compositions may contain suitable preserving, stabilizing, wetting, solubilizing, sweetening, flavouring or colouring agents.

A representative tablet comprises 0.2 mg. of 7-[imidazolinyl - (2) - amino] - 1 - methylindazole, 1 mg. of magnesium stearate, 4 mg. of polyvinyl pyrrolidone, 5 mg. of talc, 10 mg. of corn starch, 137.8 mg. of milk sugar (lactose), 0.5 mg. of dimethyl silicone oil and 1.5 mg. of polyethylene glycol 6000.

In the following Examples all temperatures are in degrees Centicgade and are uncorrected, and room temperature, i.e. between 20 and 30° C., is used unless otherwise indicated.

EXAMPLE 1

7-[Imidazolinyl-(2)-amino]indazole
[process variant (a)]

12.2 g. of S - methyl - N - indazolyl-(7)-isothiouronium iodide are dissolved in 100 cc. of absolute methanol, and 2.7 cc. of ethylene diamine are added to the solution. The mixture is heated to the boil at reflux for 1 hour, the solvent is subsequently distilled off and the residue is heated to 150° C. for 1 hour. The cooled product is dissolved in 30 cc. of 2 N hydrochloric acid, and the solution is made weakly alkaline (pH 8–9) with a 2 N aqueous sodium hydroxide solution. After removing the resulting precipitate by filtration and recrystallizing from methanol, 7-[imidazolinyl-(2)-amino]indazole, having a M.P. of 238–240° C., is obtained.

The S - methyl - N - indazolyl-(7)-isothiouronium iodide, used as starting material in this Example, is obtained as follows:

6 cc. of benzoyl chloride are added to a solution of 5 g. of ammonium thiocyanate in 25 cc. of acetone in an ice bath and stirring is effected for 10 minutes. A solution of 6 g. of 7-aminoindazole in 50 cc. of acetone is added, and the resulting mixture is heated to the boil at reflux for 1 hour. The mixture is then cooled and diluted with a 5-fold quantity of water. The resulting precipitate is filtered off, added to 70 cc. of a 2 N aqueous sodium hydroxide solution, the mixture is rapidly brought to the boil and kept at the boil for 5 minutes. The reaction mixture is acidified with glacial acetic acid, the resulting precipitate is filtered after cooling and is washed with ether. The filter residue is recrystallized from methanol and is then dissolved, together with 6 g. of methyl iodide, in 100 cc. of absolute methanol. The solution is boiled for 1 hour and is then evaporated to dryness. Crude S-methyl-N-indazolyl-(7)-isothiouronium iodide is obtained and is used for the above reaction without further purification.

In an analogous manner to that described in Example 1, 3 - bromo - 1 - propyl - 5 - propylthio-7-[4-propyl-imidazolinyl-(2)-amino]indazole may be made.

EXAMPLE 2

7-[Imidazolinyl-(2)-amino]-1-methylindazole
[process variant (a)]

50 g. of S - methyl - N - [1-methylindazolyl-(7)] isothiouronium iodide are boiled at reflux for 1 hour together with 300 cc. of methanol and 9.6 g. of ethylene diamine. The solvent is subsequently distilled off and the solid residue is heated to 150° C. for 1 hour. The cooled product is subsequently distributed between 300 cc. of chloroform and 300 cc. of a 2 N aqueous sodium hydroxide solution, the organic phase is dried and evaporated to dryness. Crystallization of the residue from ethyl acetate yields 7-[imidazolinyl-(2)-amino]-1-methylindazole having a M.P. of 180–182° C.

The S - methyl - N - [1-methylindazolyl-(7)] isothiouronium iodide, used as starting material in this Example, is obtained as follows:

28 cc. of benzoyl chloride are added to a solution of 30 g. of ammonium thiocyanate in 200 cc. of acetone in an ice bath and stirring is effected for 10 minutes. 28 g. of 7 - amino - 1 - methylindazole are subsequently added, and the resulting solution is heated to the boil at reflux for 2 hours. The reaction mixture is then cooled and diluted with a 4-fold quantity of water. The resulting precipitate is filtered off and added to 250 cc. of a 2 N aqueous sodium hydroxide solution. The resulting mixture is heated to the boil for 5 minutes. The mixture is subsequently cooled and made weakly acid with glacial acetic acid. The resulting precipitate is filtered off and washed with ether. Purification is effected by heating the reaction product to the boil for 10 minutes with 200 cc. of methanol, cooling the suspension and washing the resulting precipitate with ether.

The N-[1-methylindazolyl-(7)]thiourea, obtained in this manner, is heated to the boil for one hour together with 30 g. of methyl iodide in 300 cc. of absolute methanol, and the mixture is subsequently evaporated to dryness. Crude S - methyl - N - [1-methylindazolyl-(7)]isothiouronium iodide is obtained and is used for the above reaction without purification.

EXAMPLE 3

6-Chloro-7-[imidazolinyl-(2)-amino]-1-methylindazole
[process variant (a)]

13.5 g. of S - methyl - N - [6-chloro-1-methylindazolyl-(7)]isothiouronium iodide are heated to the boil at reflux for 1 hour together with 3 g. of ethylene diamine in 100 cc. of methanol. After distilling off the solvent a crude mixture is obtained, from which 6 - chloro - 7 - [imidazolinyl-(2)-amino]-1-methylindazole, having a M.P. of 170–172° C., is obtained after separation by column chromatography on silica gel with a mixture of chloroform/heptane/ethanol (1:1:1) and after recrystallization from methanol/ethyl acetate.

The S - methyl - N - [6 - chloro-1-methylindazolyl-(7)] isothiouronium iodide, used as starting material in this Example, is obtained as follows:

5 g. of 6 - chloro - 7 - nitro - indazole are dissolved in a mixture of 14 cc. of a 30% caustic soda solution and 90 cc. of water, 8.9 g. of dimethyl sulphate are added in one portion to the mixture, and this is stirred at 60° C. for 1 hour. After cooling, the resulting precipitate is filtered off, washed well with water and dried. The two resulting isomers are separated by boiling the crushed crude product with 150 cc. of ether and filtering off the undissolved material. The filtrate is filtered further through active charcoal, concentrated to 100 cc., diluted with 200 cc. of n-hexane and concentrated by evaporation to a volume of 70 cc., cooled and filtered. After recrystallization from methanol the two combined precipitates yield 3.1 g. of 6-chloro-2-methyl-7-nitro-indazole having a M.P. of 160–161.5° C.

The n-hexane mother liquor is concentrated by evaporation. After recrystallization from methanol the residue yields 1.1 g. of 6-chloro-1-methyl-7-nitro-indazole having a M.P. of 97–99° C. 9.9 g. of this product are dissolved in 200 cc. of ethyl acetate, 3 g. of a 5% palladium charcoal catalyst are added and hydrogenation is effected in a hydrogenation vessel in a hydrogen atmosphere. After 2 hours the theoretical amount of hydrogen is taken up. The catalyst is filtered off and the solution concentrated by evaporation. After recrystallization from petroleum ether, 7.7 g. of 7-amino-6-chloro - 1 - methylindazole, having a M.P. of 53–55° C., are obtained and are added to a solution of 7 g. of ammonium thiocyanate in 200 cc. of acetone, to which 5.5 cc. of benzoyl chloride have been added in an ice bath and which has been stirred for 10 minutes. The resulting solution is heated to the boil at reflux for 2 hours, the solvent is almost completely evaporated off and the residue is diluted with 300 cc. of water, whereupon the resulting precipitate is filtered off, taken up in 100 cc. of a 2 N aqueous sodium hydroxide solution and the mixture is rapidly brought to the boil. After boiling for 5 minutes the solution is cooled, made weakly acid with glacial acetic acid, the resulting precipitate is filtered off and washed with ether. Purification is effected by recrystallizing the precipitate from methanol. The product is dissolved in 100 cc. of absolute methanol together with 7 g. of methyl iodide, the solution is boiled for 1 hour and is then evaporated to dryness. Crude S-methyl - N - [6 - chloro - 1 - methylindazolyl-(7)] isothiouronium iodide is obtained and is used for the above reaction without purification.

EXAMPLE 4

1-Ethyl-7-[imidazolinyl-(2)-amino]indazole
[process variant (a)]

17 g. of S-methyl-N-[1-ethylindazolyl-(7)]isothiouronium iodide are heated to the boil at reflux for 1 hour together with 4 cc. of ethylene diamine in 100 cc. of methanol. After distilling off the solvent a residue is obtained which is heated to 150° C. for one hour. The cooled product is distributed between 300 cc. of chloroform and 100 cc. of a 2 N aqueous sodium hydroxide solution, the organic phase is dried and evaporated to dryness. After recrystallizing the residue from ethyl acetate, 1-ethyl-7-[imidazolinyl-(2)-amino]indazole, having a M.P. of 158–160° C., is obtained.

The S-methyl-N-[1 - ethylindazolyl-(7)]isothiouronium iodide, used as starting material in this Example, is obtained as follows:

50.1 g. of 7-nitro-indazole are dissolved in a mixture of 180 cc. of a 30% caustic soda solution and 1000 cc. of water, and 110 cc. of diethyl sulphate are added to the solution at room temperature while stirring vigorously. After half an hour the mixture heats itself to 50° C. It is stirred at 60° C. for a further hour. After cooling the precipitate is filtered off, washed with water, dried and taken up in 250 cc. of chloroform. The solution is filtered through active charcoal and concentrated by evaporation. The residue is taken up in 500 cc. of ether and filtered through active charcoal. The two resulting isomers are separated by concentrating the ether solution to 100 cc., diluting to the 5-fold quantity with n-hexane, filtering off the precipitate after 5 hours and concentrating to 200 cc. A precipitate again results, which is combined with the first precipitate. The combined precipitates are recrystallized from ethyl acetate/n-hexane, whereby 11.5 g. of 2-ethyl-7-nitroindazole, having a M.P. of 79–81° C., are obtained. The n-hexane mother liquir contains the almost pure 1-ethyl derivative. This mother liquor is dried. The residue yields 15 g. of 1-ethyl-7-nitro-indazole, having a M.P. of 69–71° C., after recrystallization from ethanol.

9.5 g. of this product are dissolved in 200 cc. of ethyl acetate, and 3 g. of a 5% palladium charcoal catalyst are added to the solution. Hydrogenation is subsequently effected in a hydrogenation vessel in a hydrogen atmosphere. After 3 hours the theoretical amount of hydrogen is taken up. The catalyst is filtered off and the solution concentrated by evaporation. The crude amine is sufficiently pure for the next reaction. After recrystallization from hexane, 1-ethyl-7-amino-indazole, having a M.P. of 72–75° C., is obtained and is added to a solution of 8 g. of ammonium thiocyanate in 50 cc. of acetone, to which 7 cc. of benzoyl chloride have been added in an ice bath and which has been stirred for 10 minutes. The resulting solution is heated to the boil at reflux for 2 hours, and after cooling is diluted with a 4-fold quantity of water. The resulting precipitate is filtered off, added to 80 cc. of a 2 N aqueous sodium hydroxide solution, and the mixture is rapidly brought to the boil. After boiling for five minutes the solution is cooled, made weakly acid with glacial acetic acid, the resulting precipitate is filtered off and washed with ether. Purification is effected by recrystallizing the precipitate from methanol. The residue is dissolved in 150 cc. of absolute methanol together with 8 g. of methyl iodide, is boiled for 1 hour and then dried. Crude S-methyl-N-[1 - ethylindazolyl-(7)]isothiouronium iodide is obtained and is used for the above reaction without purification.

EXAMPLE 5

7-(Imidazolinyl-2-amino)-1-methylindazole
[process variant (b)]

10 g. of N-(2-aminoethyl)-N'-[1-methylindazolyl-(7)] thiourea are added to a solution of 2.3 g. of potassium hydroxide in 30 cc. of ethanol, and the resulting mixture is heated to the boil at reflux for 15 hours. The mixture is subsequently acidified with concentrated hydrochloric acid and concentrated by evaporation. The residue is taken up in 150 cc. of 4 N hydrochloric acid, filtration is effected, the filtrate is made alkaline with 2 N aqueous sodium hydroxide solution and is subsequently extracted twice with 100 cc. of chloroform. The combined organic phases are dried over sodium sulphate and concentrated by evaporation. The residue yields 7-(imidazolinyl-2-amino)-1-methylindazole, having a M.P. of 180–181° C., after recrystallization from ethyl acetate.

The N-(2-aminoethyl)-N'-[1 - methylindazolyl - (7)] thiourea, used as starting material in this Example, is produced as follows:

20 g. of 7-amino-1-methylindazole are dissolved in 600 cc. of 3 N hydrochloric acid, and 24 g. of thiophosgene are added to the resulting solution. The resulting emulsion is stirred at room temperature for 24 hours. The resulting light brown precipitate is filtered off and washed thoroughly with water. The filter residue is dissolved in 1 litre of cyclohexane while heating and the undissolved material is filtered off. The solution is treated with active charcoal, filtered and concentrated by evaporation. The light yellow precipitate is sufficiently pure for the next reaction. The resulting 1-methyl-7-isothiocyanato-indazole has a M.P. of 68° C. after recrystallization from cyclohexane.

A solution of 19 g. of 1-methyl-7-isothiocyanato-indazole in 150 cc. of chloroform is added dropwise with stirring to a mixture of 30 cc. of ethylene diamine and 200 cc. of chloroform. Stirring is continued for 20 hours. The resulting small precipitate is filtered off and the filtrate concentrated by evaporation. The oil obtained as residue crystallizes in the course of time. The crystals are suspended in 400 cc. of water and filtered off after 1 hour. The white filter residue is dissolved in 300 cc. of 4 N hydrochloric acid and the solution is filtered. The filtrate is extracted twice with 300 cc. of chloroform, is subsequently made alkaline with a 2 N aqueous sodium hydroxide solution and is again extracted twice with 300 cc. amounts of chloroform. The last two chloroform extracts are combined and concentrated by evaporation. The residue is recrystallized from ethyl acetate, whereby N-(2-aminoethyl)-N'-[1-methylindazolyl-(7)]thiourea, having a M.P. of 153–156° C., is obtained.

EXAMPLE 6

5-Chloro-7-(imidazolinyl-2-amino)-1-methylindazole [process variant (c)]

12 g. of 5-chloro-7-cyanamido-1-methylindazole are heated to the boil at reflux for 4 hours together with 36 g. of ethylene diamine mono-p-toluene sulphonate in 250 cc. of n-pentanol. The mixture is subsequently cooled, whereby a crystalline precipitate results. This is filtered off and washed with ethanol. The combined filtrates are concentrated by evaporation and the resulting residue is distributed between 400 cc. of chloroform and 400 cc. of a 2 N aqueous sodium hydroxide solution. The organic phase is dried and concentrated by evaporation. After recrystallizing from methanol, 5-chloro-7-(imidazolinyl-2-amino)-1-methylindazole, having a M.P. of 218–220° C., is obtained.

The 5-chloro-7-cyanamido-1-methylindazole, used as starting material in this Example, is obtained as follows:

By using the process described in Example 3 and 5-chloro-7-nitro-indazole as starting material, 5-chloro-1-methyl-7-nitro-indazole, having a M.P. of 135° C., is obtained, subsequently 7-amino-5-chloro-1-methylindazole, having a M.P. of 121–123° C., and finally N-[5-chloro-1-methylindazolyl-(7)]thiourea, having a M.P. of 229° C.

20 g. of N-[5-chloro-1-methylindazolyl-(7)]-thiourea are suspended in 100 cc. of hot water, and the suspension is converted into a solution by the addition of a solution of 40 g. of potassium hydroxide in 150 cc. of hot water. A boiling hot solution of 33 g. of lead acetate in 80 cc. of water is rapidly stirred into this solution, whereby a black precipitate results. The mixture is heated to the boil for 5 minutes, is then cooled in an ice bath and filtered in the cold. The filtrate is slightly acidified with acetic acid, whereby a white precipitate results, which is filtered off. The resulting 5-chloro-7-cyanamido-1-methylindazole is sufficiently pure for the next reaction. After recrystallization from toluene this compound has a M.P. of 191–194° C.

By using the processes described in the preceding Examples and the corresponding starting materials, the following compounds are obtained:

| Ex. | R₁ | R₂ | R₃ | A | M.P., °C. |
|---|---|---|---|---|---|
| 7 | CH₃ | H | H | —(CH₂)₃— | 241–243 |
| 8 | CH₃ | H | H | H(4) | 178–179 |
| 9 | CH₃ | H | H | —C—CH—<br>H │<br>CH₃<br>(5)<br>—CH₂—CH—CH₂—<br>│<br>OH | 178–182 |
| 10 | H | 4-CH₃ | H | —(CH₂)₂— | 203–205 |
| 11 | H | 5-CH₃ | H | —(CH₂)₂— | 261–263 |
| 12 | H | 5-Cl | H | —(CH₂)₂— | 250–255 |
| 13 | H | 6-Cl | H | —(CH₂)₂— | 262–265 |
| 14 | CH₃ | H | OH | —(CH₂)₂— | 315–320 |
| 15 | CH₃ | H | CH₃ | —(CH₂)₂— | 225–230 |
| 16 | CH₃ | 4-CH₃ | H | —(CH₂)₂— | 170–173 |
| 17 | CH₃ | 5-CH₃ | H | —(CH₂)₂— | 176–180 |
| 18 | CH₃ | 6-CH₃ | H | —(CH₂)₂— | 265–274 |
| 19 | CH₃ | H | Cl | —(CH₂)₂— | 179–181 |
| 20 | CH₃ | 4-Cl | H | —(CH₂)₂— | 180–182 |
| 21 | CH₃ | 5-Br | H | —(CH₂)₂— | 224–227 |
| 22 | CH₃ | H | OCH₃ | —(CH₂)₂— | 165–168 |
| 23 | CH₃ | 6-OCH₃ | H | —(CH₂)₂— | |

What is claimed is:

1. A compound of the formula

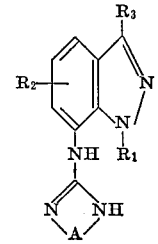

where $R_1$ is hydrogen or alkyl of 1 to 3 carbon atoms, $R_2$ is hydrogen, fluorine, chlorine, bromine or alkyl, alkoxy or alkylthio each of 1 to 3 carbon atoms, $R_3$ is hydrogen, fluorine, chlorine, bromine, alkyl or alkoxy each of 1 to 3 carbon atoms or hydroxy, and A is dimethylene, hydroxydimethylene or dimethylene mono-substituted by alkyl of 1 to 3 carbon atoms, or a pharmaceutically acceptable acid addition salt thereof.

2. A compound of Claim 1 in which $R_1$ is hydrogen or alkyl of 1 to 3 carbon atoms, $R_2$ is hydrogen, bromine, chlorine, alkyl of 1 to 3 carbon atoms or alkoxy of 1 to 3 carbon atoms, $R_3$ is hydrogen, chlorine, alkyl of 1 to 3 carbon atoms or alkoxy of 1 to 3 carbon atoms, and A is dimethylene or dimethylene mono-substituted by alkyl of 1 to 3 carbon atoms, or a pharmaceutically acceptable acid addition salt thereof.

3. A compound of Claim 1, in which $R_1$ is hydrogen or alkyl of 1 to 3 carbon atoms, $R_2$ is hydrogen, chlorine, or alkyl of 1 to 3 carbon atoms, $R_3$ is hydrogen, and A is dimethylene, or a pharmaceutically acceptable acid addition salt thereof.

4. The compound of Claim 1, which is 7-[imidazolinyl-(2)-amino]indazole.

5. The compound of Claim 1, which is 7-[imidazolinyl-(2)amino]-1-methylindazole.

6. The compound of Claim 1, which is 6-chloro-7-[imidazolinyl-(2)-amino]-1-methylindazole.

7. The compound of Claim 1, which is 1-ethyl-7-[imidazolinyl-(2)-amino]indazole.

8. The compound of Claim 1, which is 5-chloro-7-[imidazolinyl-(2)-amino]-1-methylindazole.

9. The compound of Claim 1, which is 1-methyl-7-[4-methylimidazolinyl-(2)-amino]indazole.

10. The compound of Claim 1, which is 7-[imidazolinyl-(2)-amino]-4-methylindazole.

11. The compound of Claim 1, which is 7-[imidazolinyl-(2)-amino]-5-methylindazole.

12. The compound of Claim 1, which is 5-chloro-7-[imidazolinyl-(2)-amino]indazole.

13. The compound of Claim 1, which is 6-chloro-7-[imidazolinyl-(2)-amino]indazole.

14. The compound of Claim 1, which is 3-hydroxy-7-[imidazolinyl-(2)-amino]-1-methylindazole.

15. The compound of Claim 1, which is 1,3-dimethyl-7-[imidazolinyl-(2)-amino]indazole.

16. The compound of Claim 1, which is 1,4-dimethyl-7-[imidazolinyl-(2)-amino]indazole.

17. The compound of Claim 1, which is 1,5-dimethyl-7-[imidazolinyl-(2)-amino]indazole.

18. The compound of Claim 1, which is 1,6-dimethyl-7-[imidazolinyl-(2)-amino]indazole.

19. The compound of Claim 1, which is 3-chloro-7-[imidazolinyl-(2)-amino]-1-methylindazole.

20. The compound of Claim 1, which is 4-chloro-7-[imidazolinyl-(2)-amino]-1-methylindazole.

21. The compound of Claim 1, which is 5-bromo-7-[imidazolinyl-(2)-amino]-1-methylindazole.

22. The compound of Claim 1, which is 7-[imidazolinyl-(2)-amino]-3-methoxy-1-methylindazole.

23. The compound of Claim 1, which is 7-[imidazolinyl-(2)-amino]-6-methoxy-1-methylindazole.

References Cited

UNITED STATES PATENTS

| | | | |
|---|---|---|---|
| 2,899,426 | 8/1959 | Bloom | 260—309.6 |
| 3,287,469 | 11/1966 | Harvey | 260—309.6 |
| 3,288,805 | 11/1966 | Berg | 260—309.6 |
| 3,359,274 | 12/1967 | Warner | 260—309.6 |
| 3,365,462 | 1/1968 | Holan et al. | 260—309.6 |

FOREIGN PATENTS

| | | | |
|---|---|---|---|
| 599,834 | 3/1948 | Great Britain | 260—310 C |
| 753,573 | 7/1956 | Great Britain | 260—310 C |

NATALIE TROUSOF, Primary Examiner

U.S. Cl. X.R.

260—256.4 N, 256.4 H, 256.4 C, 256.5 R, 309.6, 309.7, 310 C, 311; 424—251, 273